UNITED STATES PATENT OFFICE.

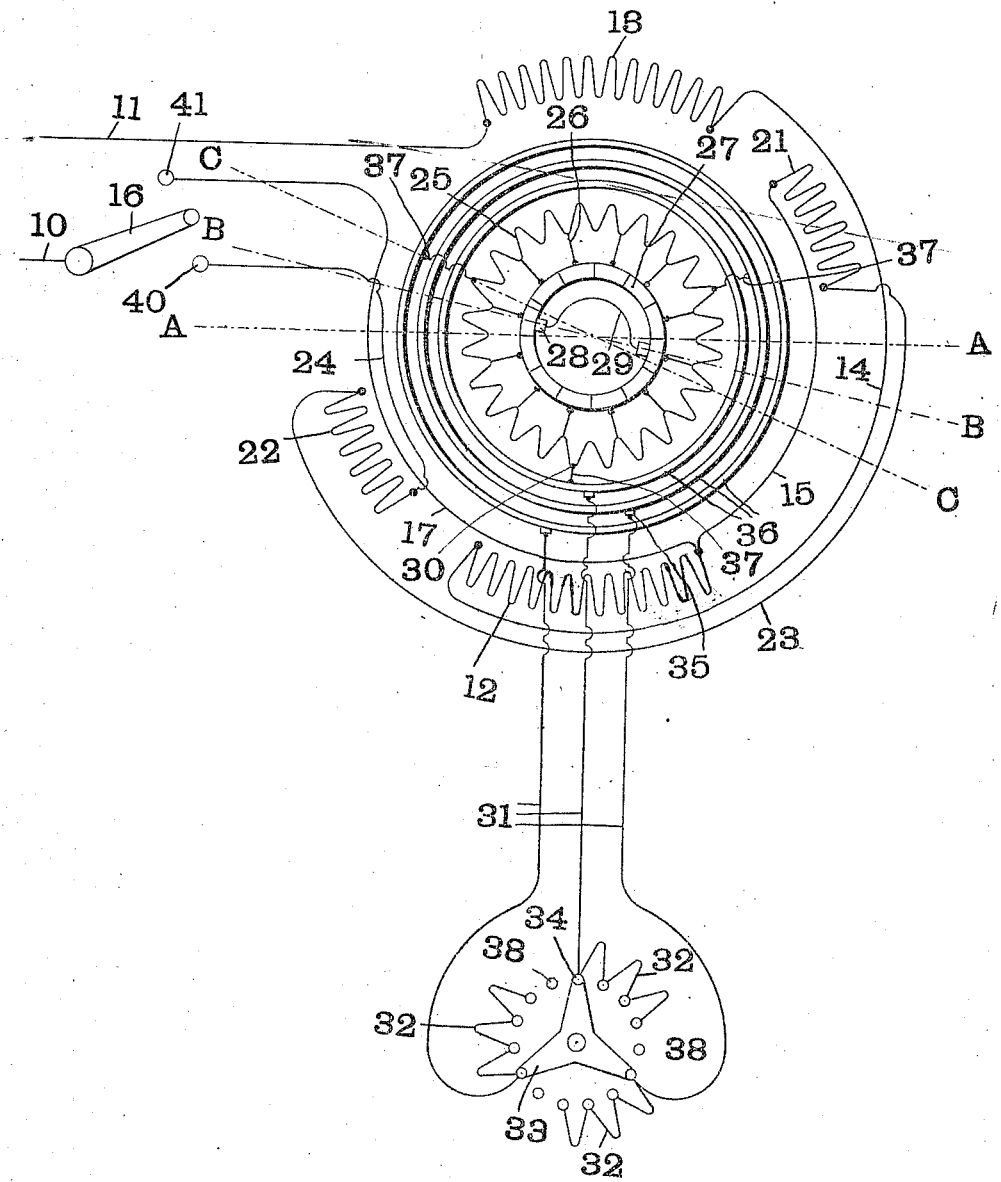

JAMES H. BRYSON, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

No. 900,478.  Specification of Letters Patent.  Patented Oct. 6, 1908.

Application filed October 7, 1907. Serial No. 396,202.

*To all whom it may concern:*

Be it known that I, JAMES H. BRYSON, a citizen of the United States, residing at St. Louis, in the State of Missouri, have invented a certain new and useful Alternating-Current Motor, of which the following is such a full, clear, and exact description as will enable any one skilled in the art to which it appertains to make and use the same, reference being had to the accompanying drawing, forming part of this specification.

My invention relates to alternating current induction motors and more specifically to means for reversing the direction of rotation of such motors. It is applicable to a number of different forms of motors, but more particularly to single phase motors of the self-starting variety in which one of the members is provided with a winding, the currents in which are commuted at starting to produce definite armature magnetic poles. I provide such a motor with a subdivided field winding, the organizations or electrical connections of which may be modified at the will of the operator to reverse the direction of movement of the rotary member of the motor. I do not claim as my invention the broad embodiment of this idea, but what I do claim as my invention and what I seek to cover by Letters Patent, is a new and simplified arrangement of the field windings for accomplishing the results stated, consisting of a fewer number of parts than have hitherto been employed. One of the advantages of this arrangement is the reduction of the switch contacts to two instead of four, which is the number generally used in the prior art. Such reduction produces superior results so far as sparking, the amount of copper and simplicity are concerned.

In the drawing, in which like characters of reference refer to similar parts, the figure represents in diagram, a type of motor embodying my invention.

Referring to the figure, 10 and 11 indicate the mains through which single phase alternating current is supplied from an external source, to the stationary member or field of the motor. The winding of this field is divided into two groups, each group being subdivided into two coils. One of these groups, the main group, is composed of the coils 12 and 13, while the other or auxiliary group, is composed of the coils 21 and 22. One end of the coil 13 is directly connected to the lead 11, and its opposite end is connected by the conductor 14 to one end of the coil 12; the opposite end of the coil 12 is connected to two branch conductors 15 and 17. The conductor 17 is connected directly to a terminal or contact 41 of a switch 16 in the lead 10, while the conductor 15 is connected through the auxiliary coil 21, conductor 23, auxiliary coil 22 and conductor 24 to another terminal or contact 40 of said switch 16.

Referring now to the rotary member or armature of the motor which, in the particular form shown in the drawing, is also the induced member, it is composed of a winding 25 connected by means of leads 26 to the segments 27 of a commutator. Brushes 28 bear upon this commutator and are connected by means of a conductor 29 which may be of any resistance desired. From equidistant points 30 in the winding 25 are led conductors 37 to three slip rings 36, upon which bear brushes 35. These brushes are connected through leads 31, with the three divisions 32 of a resistance member. 33 is a pivoted member provided with arms adapted to move over the contacts 34 connected to the resistance 32, to gradually exclude said resistances from the armature circuit. 38 are open circuit contacts adjacent to the contacts 34. When the motor is started, as hereinafter described, the arm 33 rests upon the contact 38, thereby opening the circuit through the conductors 31.

In the operation of my invention it will be evident that when the switch 16 is brought into contact with the switch terminal 41, only the main coils 12 and 13 are energized, thereby producing a field having its axial line substantially coincident with the dotted line A—A, inclined at an appropriate angle to the line of the brushes B—B to produce rotation of the armature in a given direction and with a torque dependent upon the angular displacement of the line A—A from the line B—B. Should, however, the switch 16 rest upon the terminal 40, the main coils 12 and 13 and the auxiliary coils 21 and 22 will be connected together in series producing a resultant field having its axial line substantially coincident with the dotted line C—C. The position of the brushes remaining the same, it is evident that the motor will now be rotated in a direction opposite to that in which it would rotate were the main coils 12 and 13 only in circuit. It is evident that the direction of rotation of the motor may be reversed at will.

It will, of course, be understood that I prefer to start my motor with the arm 33 on the contact 38, thereby opening the circuit through the resistance 32. After the motor has received an initial rotation the arm 33 is rotated to first include and then gradually exclude the resistance 32 from circuit and thus short-circuit the windings 25 of the motor. When this is done the brushes 28 are practically excluded from any active participation in the operation of the motor. It will, of course, be understood that by cutting the resistance 32 into and out of the circuit the speed of the motor may be regulated.

Having fully described my invention, what I claim as new and desire to secure by Letters Patent of the United States is:

In an electric motor, the combination with a pair of relatively rotatable members, of means for producing definite poles in one of said members, and a pair of windings for the other of said members, one of said windings producing poles at one side of the poles of said first member, and the other of said windings coöperating with all of said first winding to shift said poles to the other side of the poles of said first member.

In testimony whereof, I have hereunto set my hand and affixed my seal in the presence of the two subscribing witnesses.

JAMES H. BRYSON. [L. S.]

Witnesses:
ELIZABETH BAILEY,
MARY T. RAMSEY.